(12) United States Patent
Elder

(10) Patent No.: US 11,041,559 B2
(45) Date of Patent: Jun. 22, 2021

(54) DEVICE AND METHOD OF GEAR NOISE REDUCTION

(71) Applicant: 1-Up Design and Consulting, LLC, Memphis, TN (US)

(72) Inventor: Joshua Tyler Elder, Memphis, TN (US)

(73) Assignee: 1-UP DESIGN AND CONSULTING, LLC, Shenandoah Jct, WV (US)

( * ) Notice: Subject to any disclaimer, the term of this patent is extended or adjusted under 35 U.S.C. 154(b) by 139 days.

(21) Appl. No.: 16/382,523

(22) Filed: Apr. 12, 2019

(65) Prior Publication Data

US 2019/0316669 A1    Oct. 17, 2019

Related U.S. Application Data

(60) Provisional application No. 62/657,282, filed on Apr. 13, 2018.

(51) Int. Cl.
| F16H 55/17 | (2006.01) |
| F16H 57/00 | (2012.01) |
| F16H 55/16 | (2006.01) |

(52) U.S. Cl.
CPC ......... *F16H 57/0006* (2013.01); *F16H 55/16* (2013.01); *F16H 55/17* (2013.01)

(58) Field of Classification Search
CPC ............................... F16H 57/12; F16H 1/2863
See application file for complete search history.

(56) References Cited

U.S. PATENT DOCUMENTS

| 4,473,301 A | 9/1984 | Namyslo |
| 4,589,300 A | 5/1986 | Rouverol |
| 4,644,814 A * | 2/1987 | Rouverol ............ F16H 55/0806 74/457 |
| 4,651,588 A | 3/1987 | Rouverol |
| 4,674,351 A | 6/1987 | Byrd |
| 5,083,474 A | 1/1992 | Rouverol |
| 5,092,720 A * | 3/1992 | Abysov ................. B23F 19/007 407/29 |
| 5,315,790 A | 5/1994 | Kish et al. |
| 5,341,699 A | 8/1994 | Rouverol |
| 5,485,761 A | 1/1996 | Rouverol |
| 5,802,921 A * | 9/1998 | Rouverol ............ F16H 55/0806 74/458 |
| 6,080,199 A * | 6/2000 | Umeyama ........... F16H 55/0806 703/1 |

(Continued)

FOREIGN PATENT DOCUMENTS

| DE | 2509488 | 9/1976 |
| DE | 102009037624 | 7/2010 |

OTHER PUBLICATIONS

International Search Report and Written Opinion of the International Searching Authority prepared by the USPTO in connection with PCT/US2019/27228, dated Jul. 15, 2019; Entire Document (44 pages).

*Primary Examiner* — David M Fenstermacher
(74) *Attorney, Agent, or Firm* — K&L Gates LLP

(57) ABSTRACT

The present device includes gears with bending compliance in the outer portion of the gear teeth to reduce gear noise. The present device reduces the variation in gear stiffness by introducing bending compliance in the outer portion of the gear tooth, by way of a cutout or relief area in the distal end of the tooth.

17 Claims, 4 Drawing Sheets

(56) References Cited

U.S. PATENT DOCUMENTS

| | | | |
|---|---|---|---|
| 6,230,578 B1 | 5/2001 | Kim et al. | |
| 7,406,892 B2 * | 8/2008 | Takeuchi | F16H 55/16 74/409 |
| 7,526,977 B2 * | 5/2009 | Masui | F16H 55/18 74/409 |
| 7,698,964 B2 * | 4/2010 | Kashimura | F16H 55/16 74/461 |
| 8,011,267 B2 * | 9/2011 | Scheufele | F16H 55/16 74/461 |
| 8,042,423 B2 * | 10/2011 | Bannier | F16H 55/18 74/461 |
| 8,578,807 B2 * | 11/2013 | Kunz | F16H 57/0427 74/457 |
| 9,267,594 B2 * | 2/2016 | Benedict | F16H 55/17 |
| 9,291,248 B2 * | 3/2016 | Mittermair | F16H 55/06 |
| 10,018,263 B2 * | 7/2018 | Fuchigami | F16H 55/17 |
| 10,078,308 B2 * | 9/2018 | Feyer | F16H 55/18 |
| 2007/0180943 A1 | 8/2007 | Daout | |

* cited by examiner

DEVICE AND METHOD OF GEAR NOISE REDUCTION

CROSS-REFERENCE TO RELATED APPLICATIONS

This application incorporates by reference and claims the benefit of priority to U.S. Provisional Application 62/657,282 filed on Apr. 13, 2018.

BACKGROUND OF THE INVENTION

The present disclosure relates to mechanical gears. More specifically, the present disclosure relates to a method of reducing gear noise by the addition of bending compliance in the outer portion of gear teeth.

The major source of gear noise is transmission error, which is a violation of the fundamental principle of gearing. The principle states that the ratio of the rotational speeds of the geared shafts must be constant. The involute profile is the mathematically derived ideal shape to achieve this goal, but it is based on rigid bodies. Deviations from the ideal involute shape are a source of transmission error, but even with a perfectly manufactured gear, variations in stiffness are still present. Such variation in stiffness is due to the elasticity of the material and is the combination of contact stiffness and bending stiffness. The variation in stiffness increases with increasing load. The contact ratio for a typical gear pair is between 1 and 2. This means that during rotation of the gears, the load is alternately shared between one pair of gear teeth and two pairs of gear teeth. The gear mesh stiffness changes largely due to this change in the load sharing condition. These loads are often transmitted to the gearbox or housing, further increasing the noise.

It is common to have gears which have been "tip relieved", which produces a smoother load transition between the two conditions. A deviation from the ideal involute profile is introduced near the gear tooth tip. This deviation is a ramp feature, thereby sliding the load more smoothly onto the tooth and eliminating tip contact. It does not significantly change the maximum and minimum stiffness and only slightly reduces the contact ratio and load capacity.

Crowning is another method of reducing noise. However, crowning is directed to reducing edge contact due to misalignment and other gear manufacturing and mounting errors. In other words, crowning fails to modify the gear mesh stiffness variation present. Conventional methods to reduce noise are typically related to different shapes of crowning to reduce noise, but such methods only address the stiffness associated with the contact area and fail to address the bending stiffness of the whole tooth.

Accordingly, there is a need for a method of reducing gear noise by the addition of bending compliance in the outer portion of gear teeth.

BRIEF SUMMARY OF THE INVENTION

The present invention is directed to a device and method for calculating, testing, designing, and manufacturing gears with bending compliance in the outer portion of the gear tooth. The modified geometry of the present device can be implemented into a new gear design or via modifications to existing gears.

The present gear configuration includes a slot, cutout, or relief that is made into each gear tooth along the full thickness (usually "face width") of the gear and at a certain depth. The slot can be created with any number of standard manufacturing methods, such as wire EDM, milling, grinding, extruding, stamping, laser, or other. The method can include generating this shape simultaneously with the gear teeth.

The parameters of the gear geometry include the thickness of the material on each side of the cutout, the radius at the bottom of the cutout, the width of the opening on the outer perimeter, among others. The geometry can be designed for an intended purpose and/or a standard design.

The present device reduces the variation in gear stiffness by introducing bending compliance in the outer portion of the gear tooth, by way of a cutout or relief area from the end of the tooth. The cutout can be made by a number of standard machining practices. The stiffness of the gear tooth can be reduced near the tip, by means of a cutout, slot, or relief.

In an example, the cutout provides a means for transmitting load to the other side, reducing the load capacity loss. If the cutout is a narrow slit, a small displacement is allowed under moderate loads. In some examples, the modification of the cutout can be self-defeating if the load is further increased. The cutout is intended to reduce the stiffness variation through the rotation of the gears.

A goal of the present device is to reduce the higher stiffness when two teeth pairs are in mesh to match the lower stiffness when one tooth pair is in mesh. Conventional devices relate to crowning or tip relief, and address only the contact stiffness. Usually the contact stiffness is many times higher than the bending stiffness, and therefore has less effect on the system stiffness. The effect is stronger by tweaking the stiffness of the gear tooth itself. The present device addresses the actual cause/source of gear noise.

An advantage of the present invention is that is can be applied to existing gears by removing material in the distal end of the gear teeth (or implemented on new gear designs). By modifying the internal geometry of the gear tooth, the contact surface area remains the same allowing virtually all current gear applications to utilize the invention.

Another advantage of the present invention is that load sharing between two teeth may be improved, even when there is some pitch error. This may lead to the additional benefits of transmission error reduction, decreased sensitivity to pitch error, and smoother load transition.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

The present invention is directed to a device including gears with bending compliance in the outer portion of the gear tooth to reduce gear noise. The present device reduces the variation in gear stiffness by introducing bending compliance in the outer portion of the gear tooth, by way of a cutout or relief area from the end of the tooth.

Noise is often reverberated from the housing or gearbox as the loads are transmitted through the shafts and bearings. In the present device, stiffness matching is achieved by decreasing the stiffness of the gear tooth near the tip. This is primarily to counteract the increase in stiffness when there are two pairs of gear teeth in contact simultaneously. The stiffness is reduced by a specific amount and can match the stiffness as when only one pair of teeth is in contact. The gradual reduction in stiffness in the departing tooth pair coincides with an increasing stiffness of the next tooth pair and will smooth the transition of the load from one to the next. The depth of the slot can be around or greater than the point in the flank where a single pair of teeth are in contact. A slight reduction in the total system stiffness can be beneficial if the stiffness values approximately match.

The effect of the present device on gear performance and load capacity renders useless nearly all existing gear studies and calculations. Typical, dynamic load rating calculation of gears depends on a number of "factors" which help to somewhat simplify the complicated nature of gear calculation.

There are two basic limitations of a gear design: bending strength and surface durability. In most applications requiring longer gear life, the surface durability is the limiting design criteria. The allowable load for bending is usually higher, and the maximum tensile stress happens at the root, or base, of the gear tooth. The present device increases the peak bending stress on the gear flank to a level which may be higher than the root stress. Counteracting the decrease in load capacity, limited by bending failure, is the reduction of dynamic effects. The allowable load for bending, though possibly reduced, may still be higher than the allowable load for surface durability.

Figure 1A:
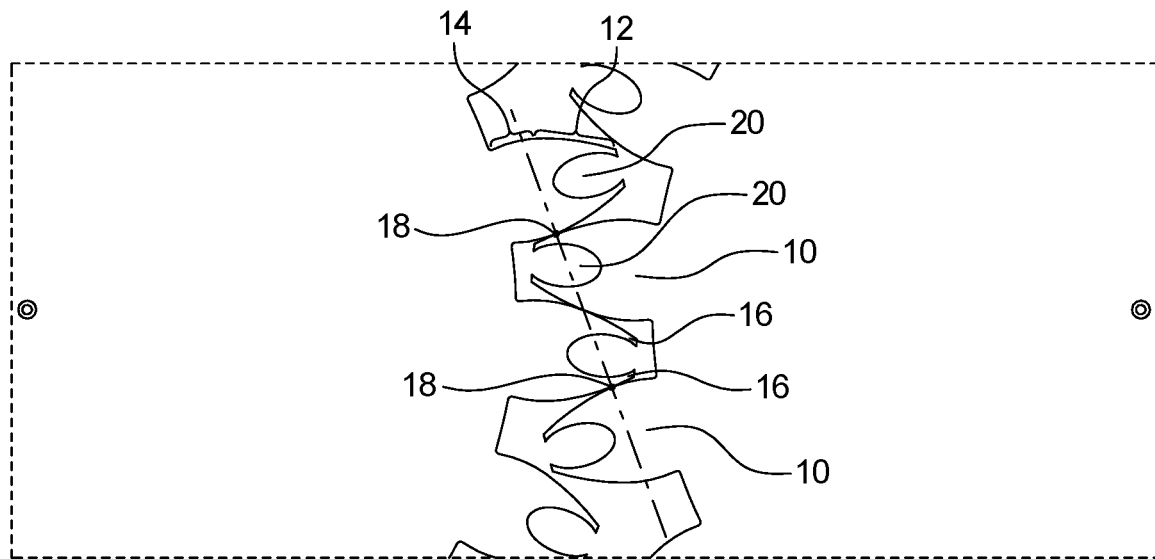
FIGS. 1A-1B illustrate an example of a gear tooth with bending compliance in the outer portion of the gear tooth.
Figure 1B:
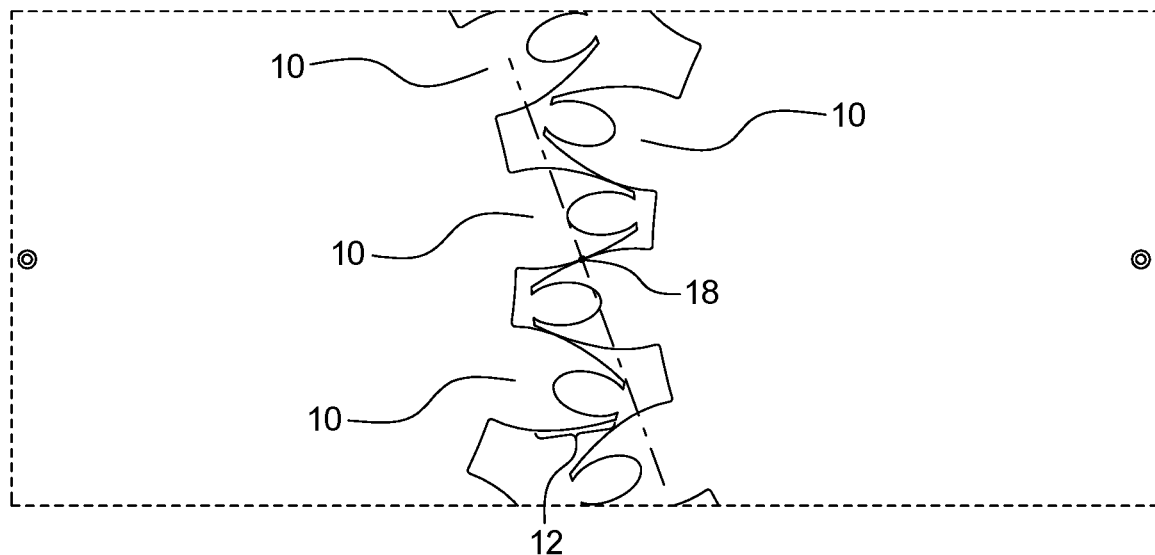

FIGS. 1A-1B illustrate an example of a gear tooth 10 with bending compliance in the distal portion 12 of the gear tooth. As shown in FIG. 1A, when the gears 10 shown have torque applied clockwise, the gears rotate accordingly. The notable change from traditional gear teeth is the unique shape of the gear teeth which feature a cutout within a distal end of the gear teeth.

The gear teeth can include any suitable gear flank shape. For example, the gear teeth can be conventionally shaped, including straight and curved outer surface designs. In an example, the gear teeth 10 can have a cross-sectional width of the distal end 12 is less than the width of the proximal end 14. Alternatively, the distal end 12 can be approximately the same width as the proximal end 14. In an example, the gear teeth can include straight teeth cut into one surface of a square or round section of a rod and operates with a pinion, which is a small cylindrical gear meshing with a gear rack.

In addition, the present device can include internal gears that include planetary gears and/or ring gears. In an example, the present gears can be used in any type of gear, including, but not limited to bevel gears, helical gears, worm gears, among others. In an example, modifying a conventional helical gear with the present cutout could be achieved using electrical discharge machining with a spiral shaped electrode.

In an example, the gear teeth 10 can include two sides that at least a portion of the sides are curved such that the cross-sectional width of the distal end 12 is less than the width of the proximal end 14. The curvature of the sides of the gear teeth can form a single point of contact, per side, at a time when the gear teeth from a first gear are meshed with the second gear teeth of a second gear. Alternatively, the curvature can form more than one point of contact at a time when the gear teeth are meshed with the second teeth of the second gear. In the example wherein the side of the gear teeth include at least one linear portion, each side of the gear teeth can form more than one contact point with a gear tooth of a second gear when the first and second gears are meshed.

The gear teeth 10 can include a cutout 20 in the distal end 12, wherein the cutout 20 creates two forklike protrusions 16 in the distal end 12. The cutout 20 of the gear 10 in the distal end 12 enables the gear teeth 10 to flex, bend, etc. which reduces gear noise. FIGS. 1A-1B illustrate two different time points, wherein FIG. 1A illustrates two contact points 18 of gear teeth, while FIG. 1B shows one contact point 18.

In an example, the cutout 20 can be filled with a suitable material. For example, the cutout can be filled with a material to absorb impact. The filling material can include, but not limited to, rubber, polymeric material, plastic, gel, etc. The filling material can further reduce the sound associated with gear noise.

Although the cutout 20 in the drawings is ovular, the shape of the forklike protrusions 16 and shape of the cutout 20 can be a variety of shapes. In other words, other gear teeth shapes are contemplated. Various shapes can be selected to offer differing levels of gear stiffness. In an example, the forklike protrusion includes an inner surface having two sides 40, wherein the sides can be parallel, or curved. The inner surface of the protrusions defines the cutout 20. An outer surface of the protrusions can be a portion of the outer surface of the gear tooth.

Figure 2A:
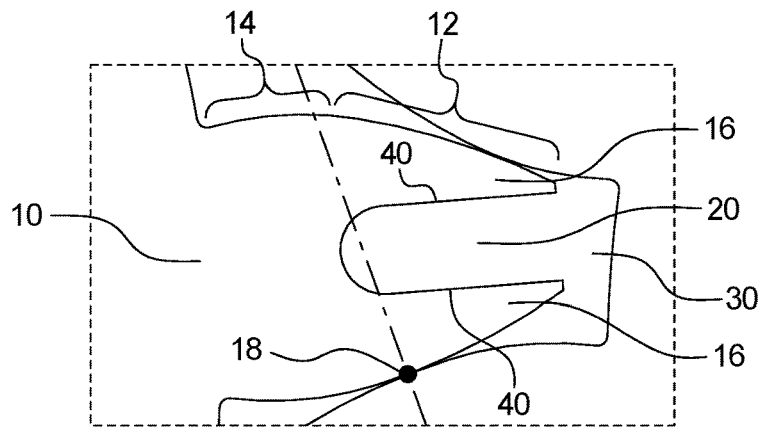
FIG. 2A is a side view of an example of a gear tooth with bending compliance in the outer portion of the gear tooth.

FIG. 2A is a cross-sectional view of a gear tooth 10 with bending compliance in the outer portion of the gear tooth. As shown in FIG. 2A, the gear tooth fits into a corresponding slot 30. This slot 30 shape may match that of traditional gear teeth, which enables the present gear 10 to be used in existing gear(s).

Figure 2B:
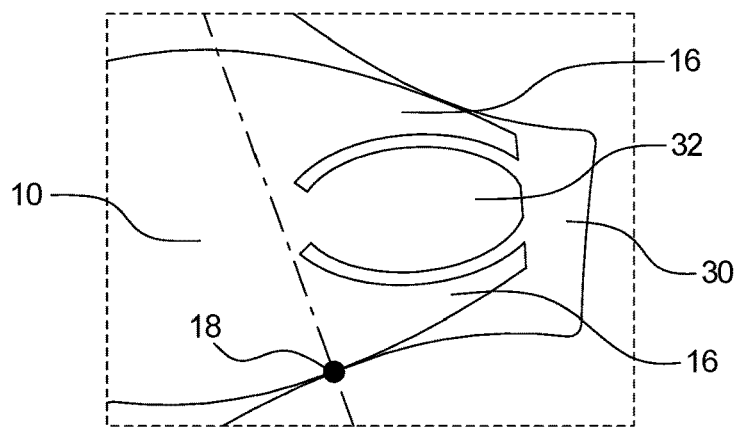
FIG. 2B is a side view of an example of a gear tooth with bending compliance in the outer portion of the gear tooth.

FIG. 2B is a cross-sectional view of an alternative gear tooth with bending compliance in the outer portion of the gear tooth. As shown in FIG. 2B, to introduce the bending compliance, curved or straight slots may me machined (e.g., electrical discharge machining, among others) into a gear tooth at specific locations which enable flexibility (and reduce gear noise). FIG. 2B further illustrates a cutout 20 that provides a center body 32 within the cutout 20 between the two forklike protrusions 16. The center body 32 can provide a bending barrier to the forklike protrusions 16 to create a stiffer gear tooth 10.

Figure 2C:
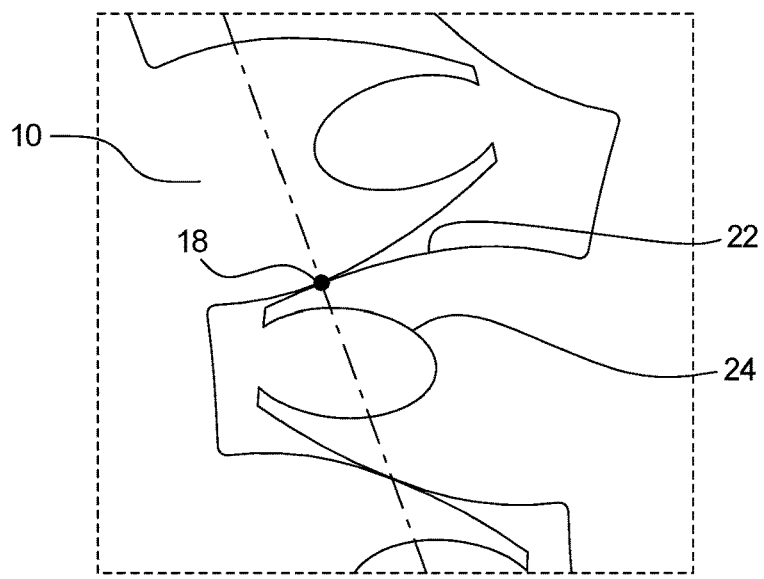
FIG. 2C is a side view of an example of a gear tooth with bending compliance in the outer portion of the gear tooth, upon which various stressors have been highlighted.

FIG. 2C is a cross-sectional view of a gear tooth 10 with bending compliance in the outer portion of the gear tooth upon which various stressors have been highlighted. As shown in FIG. 2C, various stressors are applied to a gear tooth. In this example, compressive stress 24 and tensile stress 22. The smooth transition of the load resulting from the bending compliance in the outer portion of the gear tooth 10 enables these stressors to be handled in a manner which reduces gear noise as compared to traditional gear teeth.

Figure 3A:
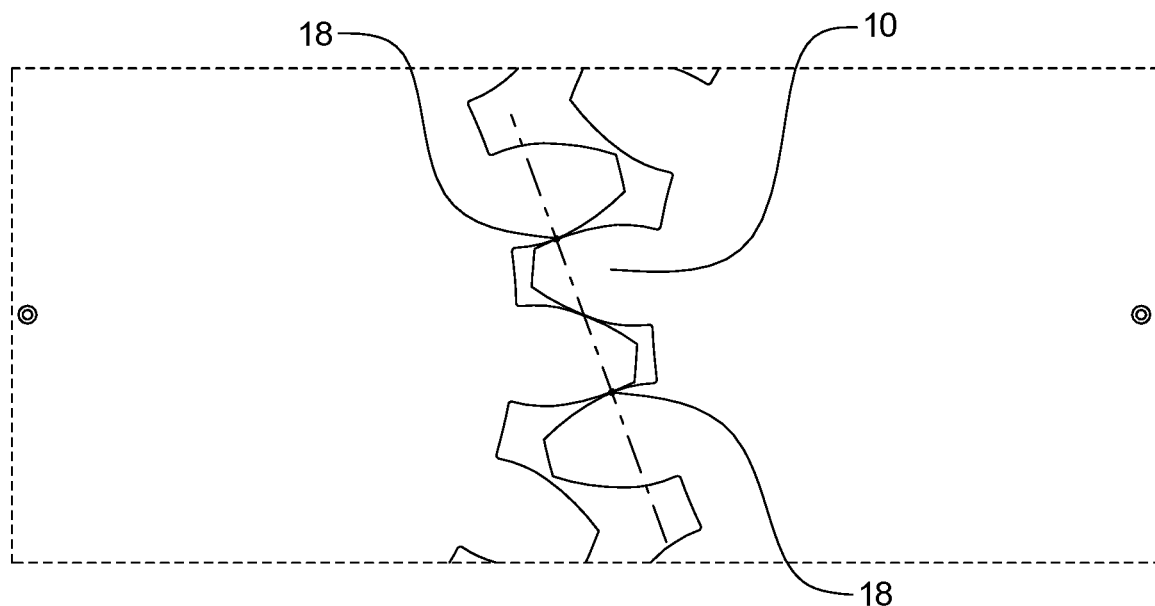
FIGS. 3A-3B illustrate examples of gear teeth in mesh.
Figure 3B:
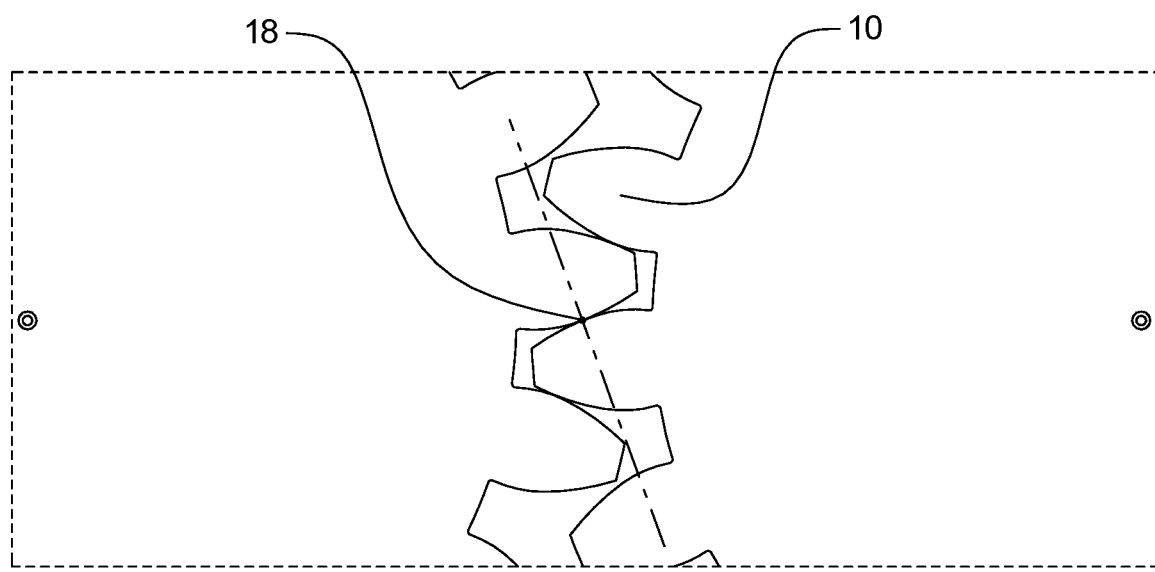

FIGS. 3A-3B illustrate conventional gear teeth in mesh having high stiffness. FIG. 3A illustrates high stiffness with two pairs of teeth in mesh. FIG. 3B shows high stiffness with one pair of teeth in mesh. In other words, FIGS. 3A-3B illustrate different points in time during the mesh. In an example, the present gear teeth can be formed by modifying conventional gears that typically alternate between having one pair of teeth in contact and having two pair of teeth in contact. Alternatively, or in addition to, the present gear teeth can be used in non-involute gear varieties (e.g., modifying non-involute gear teeth to include the cutout without any modification to the non-curved outer surface of the gear teeth).

Figure 4A:
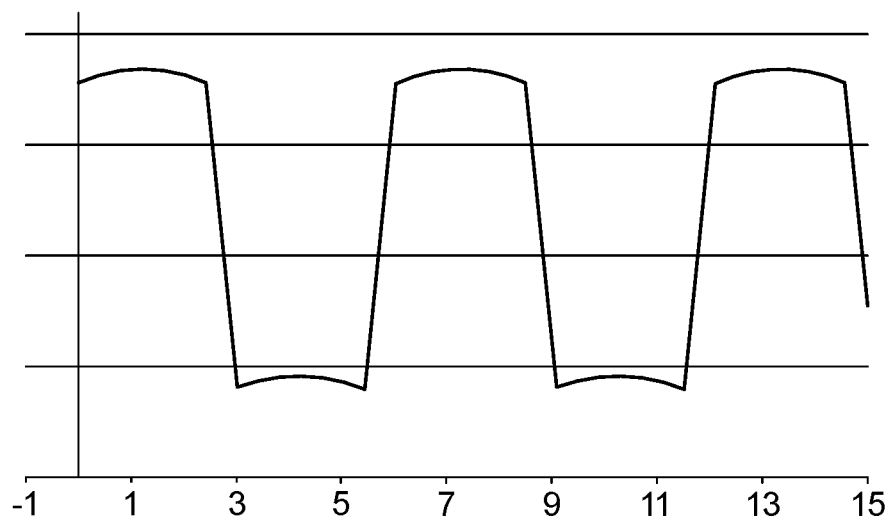
FIGS. 4A-4B illustrate the difference in gear mesh stiffness between traditional gears and gears with teeth featuring bending compliance in the outer portion of the gear tooth.
Figure 4B:
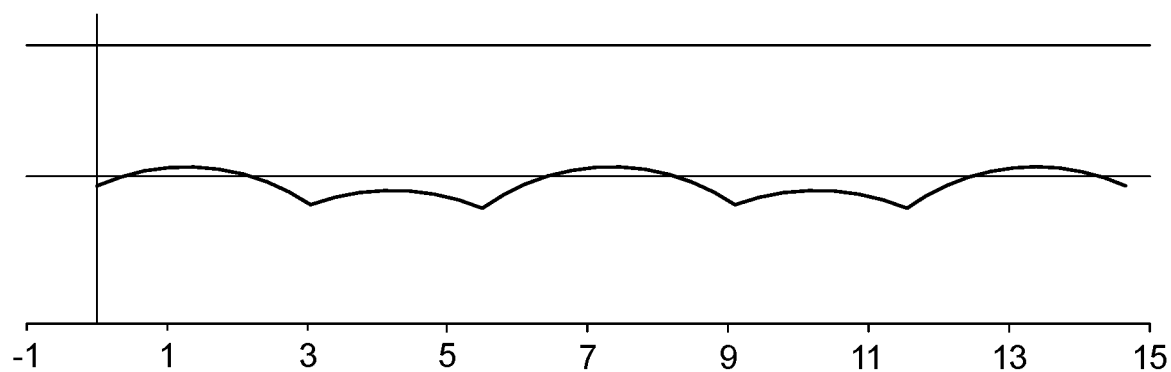

FIGS. 4A-4B illustrate the difference in gear mesh stiffness between traditional gears (FIG. 4A) and the present gear teeth (FIG. 4B) featuring bending compliance in the outer portion of the gear tooth 10. As shown in FIGS. 4A-4B, the variation in gear mesh stiffness is greatly reduced by the use of gears with teeth featuring bending compliance in the outer portion of the gear tooth.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A gear comprising:
    a gear body, wherein a cross-section of the gear body is a disk having an outer perimeter; and
    a plurality of gear teeth extending from the outer perimeter of the gear body at regular intervals, wherein each gear tooth includes:
        a distal end distal from the gear body and a proximal end adjacent to the gear body;
        two side edges connecting the distal end to the proximal end;
        a cutout in the distal end of the gear tooth, wherein the cutout forms at least two forklike protrusions in the distal end of the gear tooth, wherein the cutout includes:
            a radiused surface along a surface of the cutout closest to the gear body; and
            two side walls extending from the radiused surface to the proximal end of the gear tooth:
                wherein the two sidewalls and the radiused surface are tangent at their intersection:
                    wherein each protrusion has a width that increases with depth from the distal end.

2. The gear of claim 1, wherein the cutout is ovular.

3. The gear of claim 1, wherein the two side walls of the cutout are radiused.

4. The gear of claim 1, wherein the width of the distal end is less than the width of the proximal end.

5. The gear of claim 1, wherein at least a portion of the side edges is curved.

6. The gear of claim 1, wherein the forklike protrusions include a protrusion inner surface, wherein the protrusion inner surface includes two protrusion sides, wherein the two protrusion sides are parallel.

7. The gear of claim 1, wherein the two side walls of the cutout, are linear.

8. A gear set comprising:
    a pair of mating gears, wherein at least one gear includes
        a gear body, wherein a cross-section of the gear body is a disk having an outer perimeter, and
        a plurality of gear teeth extending from the outer perimeter of the gear body at regular intervals, wherein each gear tooth includes
            a distal end distal from the gear body and a proximal end adjacent to the gear body,
            two side edges connecting the distal end to the proximal end,
            a cutout in the distal end of the gear tooth, wherein the cutout forms two forklike protrusions in the distal end of the gear tooth, wherein the cutout includes:
                a radiused surface along a surface of the cutout closest to the gear body; and
                two side walls extending from the radiused surface to the proximal end of the gear tooth;
                    wherein the two sidewalls and the radiused surface are tangent at their intersection;
        wherein each protrusion has a width that increases with depth from the distal end.

9. The gear set of claim 8, wherein the two side walls of the cutout are radiused.

10. The gear set of claim 8, wherein the width of the distal end is less than the width of the proximal end.

11. The gear set of claim 8, wherein at least a portion of the side edges is curved.

12. The gear set of claim 8, wherein when the pair of mating gears are engaged with each other, one point of contact exists between the mating gear teeth.

13. The gear set of claim 8, wherein the forklike protrusions include a protrusion inner surface, wherein the protrusion inner surface includes two protrusion sides, wherein the two sides are parallel.

14. The gear set of claim 8, wherein the forklike protrusions include a protrusion inner surface, wherein the protrusion inner surface includes two protrusion sides, wherein the two sides are curved.

15. The gear set of claim 8, wherein the cutout is ovular.

16. The gear set of claim 8, wherein the cutout is tubular.

17. The gear set of claim 8, wherein the two side walls of the cutout are linear.

* * * * *